US010490962B2

(12) United States Patent
Badie et al.

(10) Patent No.: US 10,490,962 B2
(45) Date of Patent: Nov. 26, 2019

(54) MINIMUM ROTATION BAYONET ELECTRICAL CONNECTOR

(71) Applicant: THALES DEFENSE & SECURITY, INC., Clarksburg, MD (US)

(72) Inventors: Mehrdad Badie, Gaithersburg, MD (US); Jeffrey Dickens, Baltimore, MD (US)

(73) Assignee: THALES DEFENSE & SECURITY, INC., Clarksburg, MD (US)

(*) Notice: Subject to any disclaimer, the term of this patent is extended or adjusted under 35 U.S.C. 154(b) by 0 days.

(21) Appl. No.: 16/186,326

(22) Filed: Nov. 9, 2018

(65) Prior Publication Data

US 2019/0148899 A1    May 16, 2019

Related U.S. Application Data

(60) Provisional application No. 62/585,285, filed on Nov. 13, 2017.

(51) Int. Cl.
| | |
|---|---|
| *H01R 13/625* | (2006.01) |
| *H01R 33/46* | (2006.01) |
| *H01M 2/30* | (2006.01) |
| *H02J 7/00* | (2006.01) |
| *H01R 13/22* | (2006.01) |

(52) U.S. Cl.
CPC ............ *H01R 33/465* (2013.01); *H01M 2/30* (2013.01); *H01R 13/625* (2013.01); *H02J 7/0013* (2013.01); *H02J 7/0045* (2013.01); *H01R 13/22* (2013.01)

(58) Field of Classification Search
CPC .............. H01R 13/625; H01R 2103/00; H01R 13/639; H01R 13/53; H01R 13/71; H01R 2201/26; H01R 33/465; H01R 2/30; H01R 7/0013; H01R 7/0045
See application file for complete search history.

(56) References Cited

U.S. PATENT DOCUMENTS

| | | | | |
|---|---|---|---|---|
| 6,226,068 | B1* | 5/2001 | Arcykiewicz | H01R 13/625 439/314 |
| 6,666,701 | B1* | 12/2003 | Burkhardt | H01R 13/625 439/314 |
| 2007/0238341 | A1* | 10/2007 | So | H01R 13/447 439/172 |
| 2017/0321850 | A1* | 11/2017 | Chien | F21V 29/20 |

* cited by examiner

*Primary Examiner* — Xuong M Chung Trans
(74) *Attorney, Agent, or Firm* — Arent Fox LLP (57) ABSTRACT

Devices, systems, and methods for providing a bayonet electrical connector for connecting electrical components, such as for securely connecting a battery or other device to a charger, a bayonet based power source, or for providing a similar type connection for another device such as a radio, using minimal space requirements.

16 Claims, 5 Drawing Sheets

Configuration with one FULL Bayonet

MINIMUM ROTATION BAYONET ELECTRICAL CONNECTOR

CROSS REFERENCE TO RELATED APPLICATION

This application claims priority to U.S. Provisional Patent Application No. 62/585,285, filed Nov. 13, 2017. The disclosure of the priority application is incorporated in its entirety herein by reference.

TECHNICAL FIELD

Aspects of the disclosure relate to the field of electrical and electronic components, and in particular to a bayonet electrical connector for connecting electrical components, such as for securely connecting a battery to a charger, a bayonet based power source, and/or for providing a similar type connection for another device such as a radio, using minimal space requirements.

BACKGROUND

Some types of batteries (e.g., a PRC-148 and a PRC-152 type battery) may include a top contact for rotational engagement with a charger or radio and bottom contacts that may be flush with and/or protrude from a side of the battery that is not configured for rotational engagement. When charging some types of batteries on a tactical charger the bottom charging contacts of the battery are used due to space requirements. When charging batteries via the bottom charging contact, the batteries do not need to be rotated to engage with the charger and may be placed side by side; however, there are significant disadvantages with using this method in a tactical charger. For example, in this orientation the discharge contacts are facing up and are prone to corrosion if they are exposed to rain or other moisture. Also, due to the need in some applications for redundant contacts and a universal design capable of charging multiple battery types (e.g., both a PRC-148 and a PRC-152 battery) the force that must necessarily be applied for sufficient contacts may exceed the battery weight. In this event, the use of retention straps may become necessary, and this approach may thereby cause issues with intermittent connections, among other problems. This approach may therefore have the following disadvantages:

Poor retention of the battery that requires a shock cord to hold down the battery during charge; and The necessity for 16 contact pins to charge both PRC-148 and PRC-152 batteries.

SUMMARY

In order to overcome various problems of the related art, including but not limited to those enumerated above, such as by enabling charging of a battery via the top contacts, aspects of the present disclosure provide a more stable connection that is not as susceptible to environmental conditions using an engagement mechanism requiring minimal rotation to create a solid connection between a battery and charger, a battery and a bayonet based power source, or for providing a similar type connection for another device such as a radio, using minimal space requirements. The current disclosure relates to an engagement mechanism including a minimal rotation bayonet that reduces the amount of space needed to install a battery onto a charger or for use, for example, with any suitable device that may receive output from the battery for operation, such as, but not limited to, a radio powered by the battery (such devices also interchangeably referred to herein as "devices for operational engagement with a battery").

Aspects of the present disclosure include devices, systems, and methods relating to electrical and electronic components and making and use thereof, and in particular to an bayonet electrical connector for connecting electrical components, such as for use with a battery to be securely connected to and charged by a charger, or for providing a similar type connection for another device such as a radio, using minimal space requirements.

In one aspect of the disclosure, the minimal rotation bayonet may be usable with a device for operational engagement with a battery, which may for example be engaged with battery charging device and/or a radio. The aforementioned device may include a single minimal rotation bayonet or multiple minimal rotation bayonets for rotatably receiving a battery or other device to be engaged therewith. Each bayonet may include a bayonet body, a first contact portion extending from the bayonet body, and a second contact portion extending from the bayonet body. The bayonet body may further include a first and second cutout portions adjacent to the first and second contact portions. The battery or other device engageable with the bayonet body may include a first contact portion that is engageable with the at least a first contact portion of the bayonet body upon engagement of the battery or other device with the bayonet and upon rotation of the engaged battery or other device with the bayonet into full engagement in less than about 20 degrees of rotation. The battery or other device may include a second contact portion engageable with the at least a second contact portion of the bayonet body upon rotation of the engaged battery or other device with the bayonet in less than about 20 degrees of rotation. Thus, in operation, the battery or other device may be engaged with the bayonet by orienting the battery or other device approximately 20 degrees or less with relation to the bayonet, pressing the battery or other device toward the bayonet, and rotating the battery or other device so that the first and second contact portions fully engage with the respective first and second contact portions of the battery or other device. Thus, the battery may reliably rotatably installed onto a bayonet with minimal space requirements. Additional advantages and novel features of these aspects will be set forth in part in the description that follows, and in part will become more apparent to hose skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
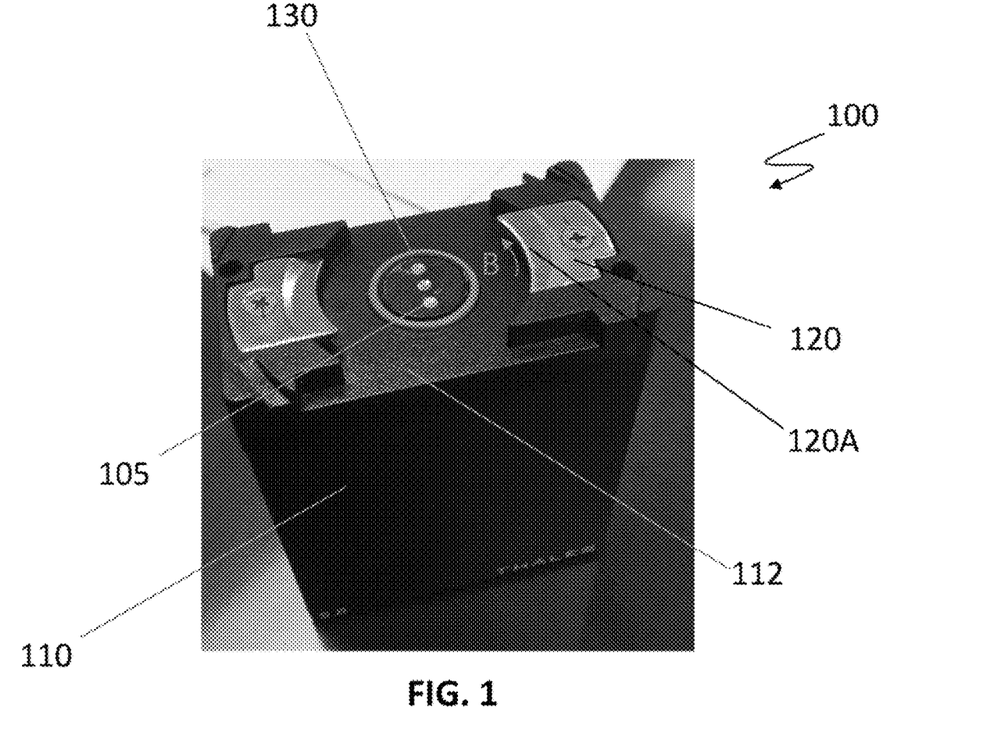
FIG. 1 shows an example battery usable with various aspects of the devices, systems, and methods of the present disclosure.
Figure 2:
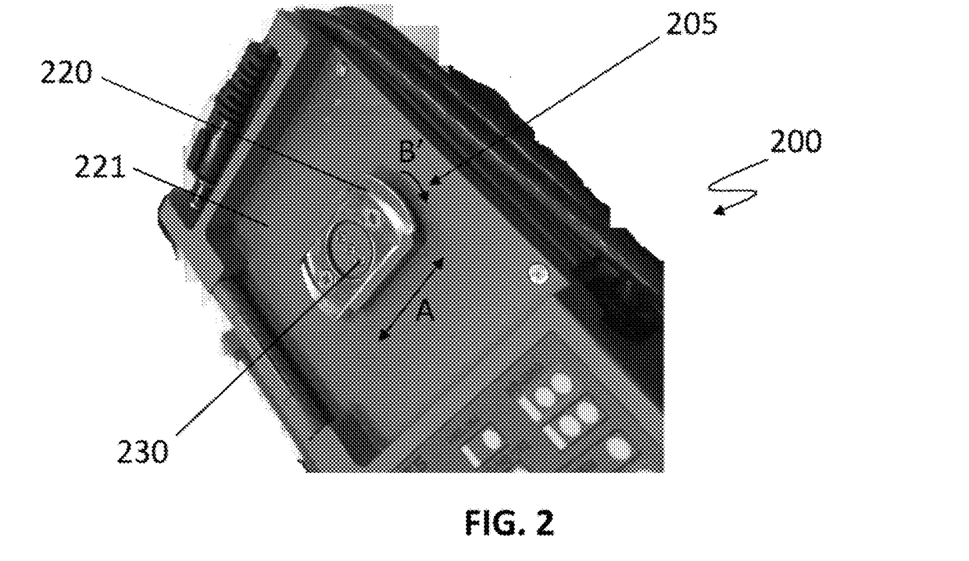
FIG. 2 shows an example charger having a single bayonet for engagement with a battery for charging.

Various types of batteries, such as PRC-148 or PRC-152 batteries used in robust and other radio applications, may be charged from either top contacts or through a set of bottom contacts. An example such battery 100 is shown in FIG. 1. A battery 100 may be charged from the top battery contacts 105 (e.g., for positive lead voltage connection), for example, using a bayonet connector in a similar manner to how the battery 100 may be installed onto a radio (see, e.g., FIG. 2, showing a charger 200 having a single bayonet connector 205 for charging a battery, such as battery 100 of FIG. 1). As shown in FIG. 1, the battery 100 may also have a battery body 110, one or more additional contact portions 120 (e.g., ground contacts), and, optionally, a seal portion 130 for providing a seal for the top battery contacts 105, such as during charging activity and/or when installed onto a charger 200 (FIG. 2). Among other advantages, the seal 130 may help ensure proper operation in wet conditions. In the example battery 100 of FIG. 1, the additional contact portions 120 may have an extending contact lip portion 120A. In the example shown in FIG. 1, the lip portion 120A is optionally curved along direction B so as to form a ramp portion extending away from the top surface 112 of the battery body in direction B.

As further shown in FIG. 2, one example charger 200 may include a single bayonet connector 205 having a contact portion 220 that corresponds to the contact portion 120 of a battery to be charged (e.g., battery 100 of FIG. 1) and one or more contacts 230 corresponding to other contacts of a battery (e.g., top battery contacts 105 of battery 100 of FIG. 1) that may be charged by the charger 200.

As also shown in FIG. 2, a bayonet 205 may be connected to a charger surface 221. Contact portions 220 of bayonet 205 may optionally extend laterally away from contacts 230, such as in the directions A shown in FIG. 2, so as to provide an extending contact lip. In the example shown in FIG. 2, contact portion 220 also is optionally curved along direction B so as to form a ramp in direction B' as shown in FIG. 2.

Figure 3:
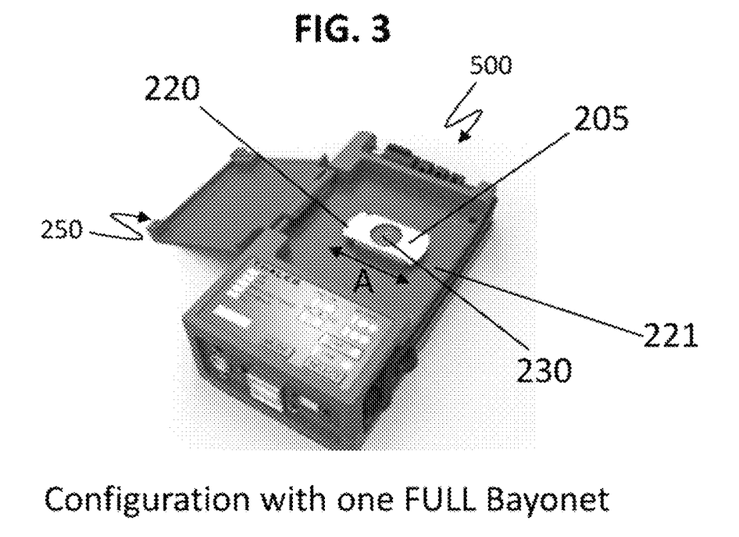
FIG. 3 shows another view of an example charger having a single bayonet for engagement with a battery for charging.
Figure 4:
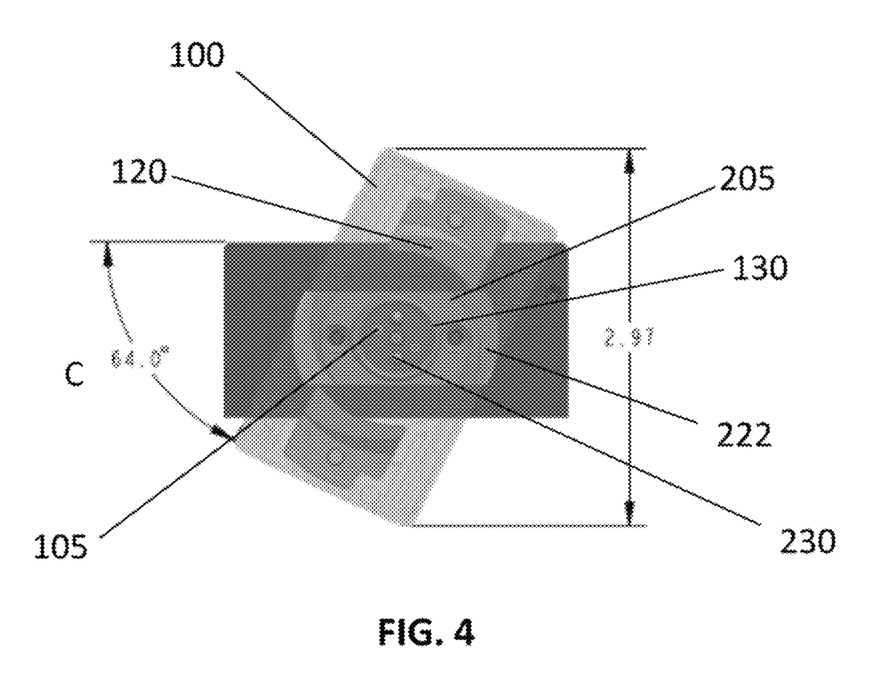
FIG. 4 shows a representative see-through overhead view of the example battery of FIG. 1 in process of being engaged with the example bayonet of the charger of FIG. 2.

Another view of an example single bayonet type charger similar to the charger shown in FIG. 2 is shown in FIG. 3. The charger 500 may include a bayonet 205 that may in turn be connected to or otherwise mounted to or engaged with a charger surface 221. Contact portions 220 of bayonet 205 may optionally extend laterally away from contacts 230, such as in the directions A, so as to provide an extending contact lip. In the example shown in FIG. 3, contact portion 220 also is optionally curved so as to form a ramp configured to contact and engage with battery contact lip(s) 120 (FIG. 4). The charger 500 may further include a pivotable lid 250 for covering the bayonet 205 and the charger surface 221.

FIG. 4 shows an example see-through overhead view of an example battery (e.g., battery 100 of FIG. 1) in process of being engaged with an example bayonet of a charger (e.g., bayonet 205 of FIG. 2). To engage the battery 100 with the bayonet, the battery 100 is initially positioned as shown in FIG. 4. Force may optionally be applied to the battery 100 toward the bayonet 205, so that seal 130 and/or area containing top battery contacts 105 are compressed. The battery 100 is then rotated in the clockwise direction C, such that contact portion(s) 120 of battery 100 slide beneath lip(s) 220 of the bayonet. In this manner of engagement, the battery 100 may be securely retained in the bayonet and a reliable connection between top battery contacts 105 and charger contacts 230 may be made, and reliable connection between battery contact portion 120 and charger contact lips 222 may also be made. However, in the arrangement shown in FIG. 4, the amount of space needed for sufficient rotation in direction C of the battery 100 into position with the bayonet 205 may be prohibitive. For example, the amount of rotation required may result in a large amount of open space being required to be maintained about the surface (e.g., surface 221 in FIG. 3) of the charger surrounding the bayonet 205, which may reduce the number of charging ports (bayonets) that may be emplaced near one another and contemporaneously used on a given available surface area 221 (FIG. 3) of a charger (e.g., charger 500 in FIG. 3).

In order to securely retain a battery, such as a PRC-148 or PRC-152 battery, on a tactical charger or other device, such as to a radio (e.g., radios PRC-148 and PRC-152), a minimal rotation bayonet may be used. The previously discussed bayonet design, such as is shown in FIGS. 2-4, includes use of a metal plate approximately ¾" in width that has rounded ends (see, e.g., charger contact lip 222 of FIGS. 2 and 4). As described and shown with respect to FIG. 4, this connector mates with the two metal negative or ground plates that are installed on the top of the battery. When the battery is rotated into position, the negative plates on the battery slide over the top of the bayonet connector, securing the battery into place and providing a ground path. This design however requires a large amount of space to rotate the battery into position.

The minimal rotation bayonet in accordance with aspects of the present disclosure may maintain the ability to secure the battery and provide a ground path, while also greatly reducing the amount of space needed to install the battery. This approach also increases the number of batteries that may be fit into a smaller area or footprint of a charger or device to be powered by such batteries. An example of a charger having an minimal rotation bayonet is shown and described with respect to FIGS. 5-11.

In order to fit multiple bayonet ports (e.g., two PRC-148 battery chargers) into a smaller area or footprint of a battery charger (e.g., a UBC-Lite), in one example implementation in accordance with aspects of the present disclosure, the design of the bayonet is altered relative to that of FIGS. 2 and 4 to reduce the space required to rotatably engage the battery with each bayonet for charging. A similar arrangement may be used for devices having more than one battery to supply power for the devices. As a result of this approach, two or more bayonet ports may thereby be provided in a limited available space or footprint. One impact of this approach is to have a battery charging product or other device that is about 25% smaller overall, while maintaining the same water sealed interface between the charger or other device and the battery.

Figures 5, 6:
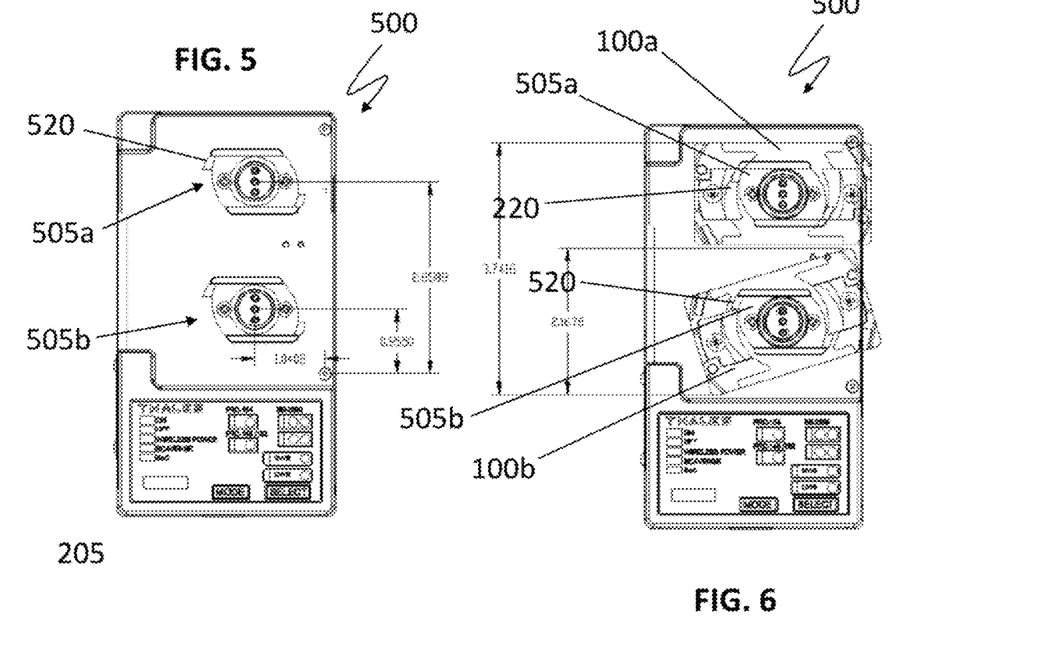
FIG. 5 shows an example battery charger having multiple minimal rotation bayonets, in accordance with aspects of the present disclosure.
FIG. 6 shows batteries in rotated and unrotated positions relative to the bayonets for the battery charger of FIG. 5.

An example implementation of a battery charger using a minimal rotation bayonet in accordance with aspects of the present disclosure is shown in FIGS. 5 and 6. In FIG. 5, an example battery charger 500 having multiple minimal rotation bayonets 505a, 505b is shown. Each bayonet 505a, 505b includes one or more contact portions 520 that extend laterally therefrom, and are similar to, but much smaller in cross-sectional area than, the contact portions 220 for the bayonets shown in FIGS. 2 and 4. For example, each bayonet 505a and 505b may include a cut out portion 510 that is adjacent to the contact portion 520. As described in further detail below, the cut out portion 510 may be configured to clear the contact lip portion 120A (FIG. 1) of each battery 100. As shown in FIG. 6, when a battery 100 is emplaced on a bayonet 505b, in order to engage the battery 100 with the bayonet 505b, the battery 100 may be rotated a much smaller angle when engaged with bayonet(s) 505a and/or 505b than for the bayonet 205 of FIG. 4, for example. In FIG. 6, battery 100a is shown in a rotated position relative to bayonet 505a, and battery 100b is shown in an unrotated position relative to bayonet 505b. Similar to the bayonet 120 of FIG. 4, the contact portion 520, as shown in the position for the battery 100a engaged with bayonet 505a, is engaged with the battery contact lip 120.

Figure 7:
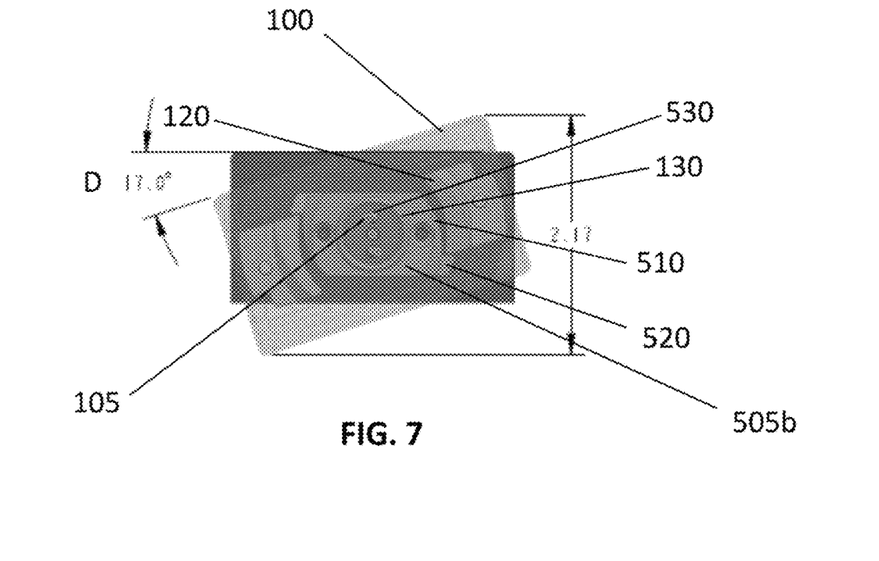
FIG. 7 shows a representative see-through overhead view of an example battery in process of being engaged with an example bayonet of the charger of FIGS. 5 and 6, in accordance with aspects of the present disclosure.

FIG. 7 shows a representative see-through overhead view of an example battery (e.g., battery 100 of FIGS. 5 and 6) in process of being engaged with an example bayonet of a charger (e.g., bayonet 505a or 505b of FIGS. 5 and 6), in accordance with aspects of the present disclosure. To engage the battery 100 with the bayonet, the battery 100 is initially positioned as shown in FIG. 7. Force may optionally be applied to the battery 100 toward the bayonet, so that seal 130 and/or area containing top battery contacts 105 are compressed. The battery 100 is then rotated in the clockwise direction D, such that lip 120 of battery 100 slides beneath contact portion 520 of the bayonet. In this manner of engagement, the battery 100 may be securely retained in the bayonet and a reliable connection between battery contacts top 105 and charger contacts 530 are made, and between battery contact lips 120 and charger contact portions 520 may also be made, but with much less angle of rotation than for the bayonet 205 of FIGS. 2 and 4.

Because of the small angle of rotation (e.g., less than 20 degrees of rotation) required to fully engage the battery 100 with each bayonet 505a, 505b, as shown in FIG. 6, multiple batteries may be engaged and charged in a smaller area of charger 500 than would be possible using the bayonet 205 of FIGS. 2 and 4, which requires a much larger rotational angle of engagement, which would thereby interfere with the adjacent battery and bayonet, so as to prevent multiple engagement.

Figure 8:
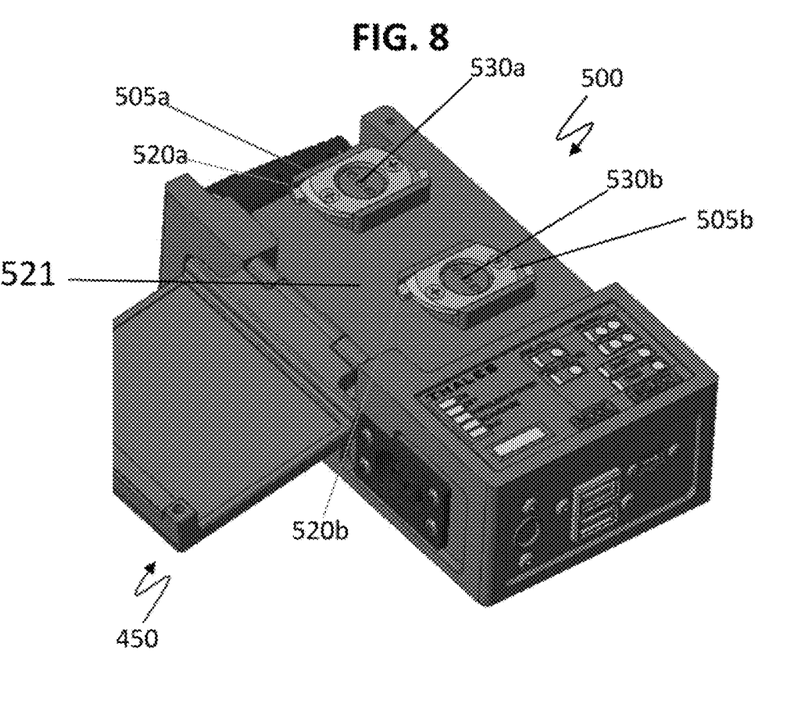
FIGS. 8 and 9 show additional views of an example charger having bayonets similar to those shown and described with respect to FIGS. 5-7.
Figure 9:
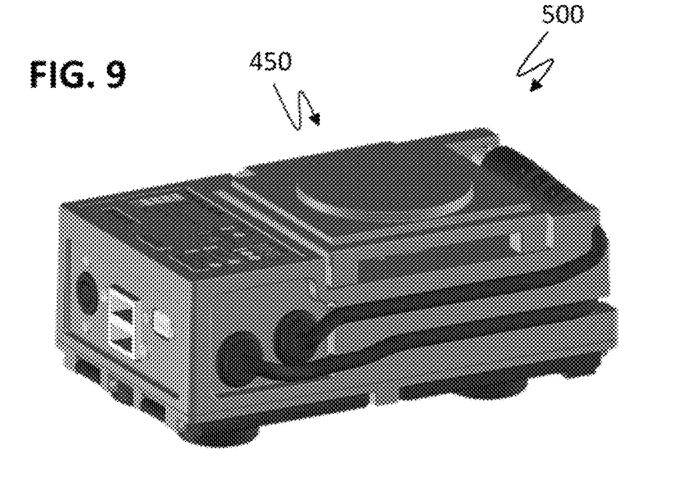

FIGS. 8 and 9 show additional views of an example charger having bayonets similar to those shown and described with respect to FIGS. 5-7. In FIG. 8, an example battery charger 500 having multiple minimal rotation bayonets 505a, 505b is shown. Each bayonet 505a, 505b includes one or more contact portions 520a and 620b that extend laterally therefrom, and are similar to, but much smaller in cross-sectional area than, the contact portions 220 for the bayonets shown in FIGS. 2 and 4. As shown in FIG. 8, each bayonet 505a and 505b may include two sets of contact portions, with the second contact portion in the example implementation shown being similar to or identical to contact portions 520a and 520b, for example. Accordingly, a charger 500 with minimal rotation bayonets as described above with respect to FIGS. 5-7 may include additional charging ports (e.g., bayonets 505a and 505b and contacts 530a and 530b) in a smaller charger surface area 521. Further, as shown in FIG. 8, the charger 500 may include a pivotable lid 450 capable of pivoting between a charging port covering position as shown in FIG. 9, and a charging port exposure position as shown in FIG. 8.

Figure 10:
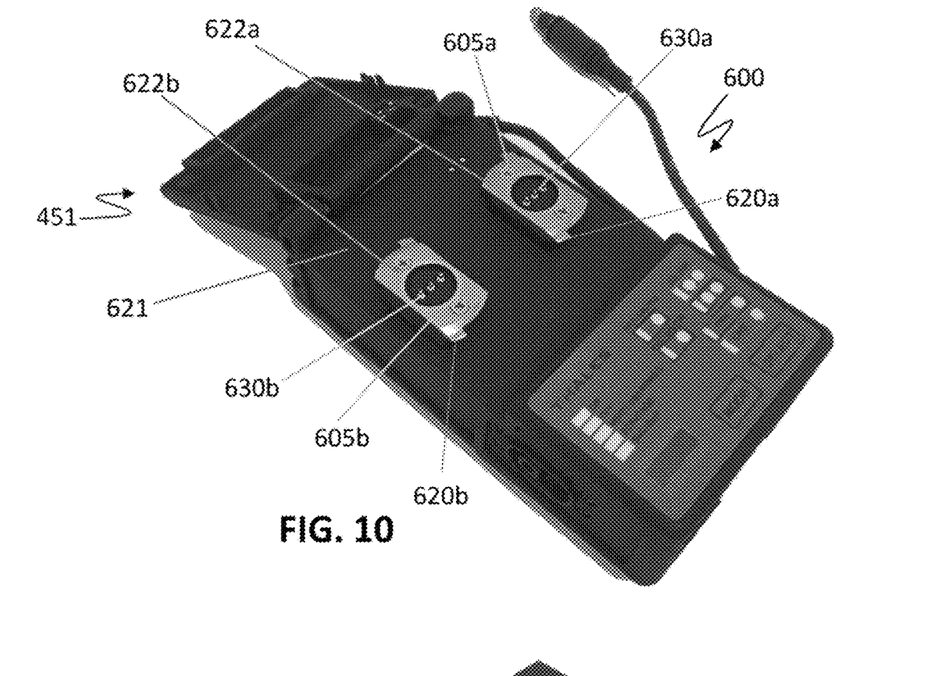
FIG. 10 shows a view of an example charger having bayonets similar to those shown and described with respect to FIGS. 5-7.

FIG. 10 shows an example charger having bayonets similar to those shown and described with respect to FIGS. 5-9. In FIG. 10, an example battery charger 600 having multiple minimal rotation bayonets 605a and 605b is shown. Each bayonet 605a and 605b may have a first side opposite second surfaces 622a and 622b, wherein the first side may be in contact with or connected to surface 621 of the device 600. Further, each bayonet 605a and 605b may have a second side 622a and 622b opposite the aforementioned first side and configured to contact a battery (e.g., 601A and 601b in FIG. 11) when the battery is rotatably installed onto device 600. Each bayonet 605a and 605b may further include one or more contact portions 620a and 620b respectively. Each of the bayonets 605a and 605b may be arranged on a charger surface 621 so as to allow for engagement with a corresponding set of batteries 601a and 601b.

Figure 11:
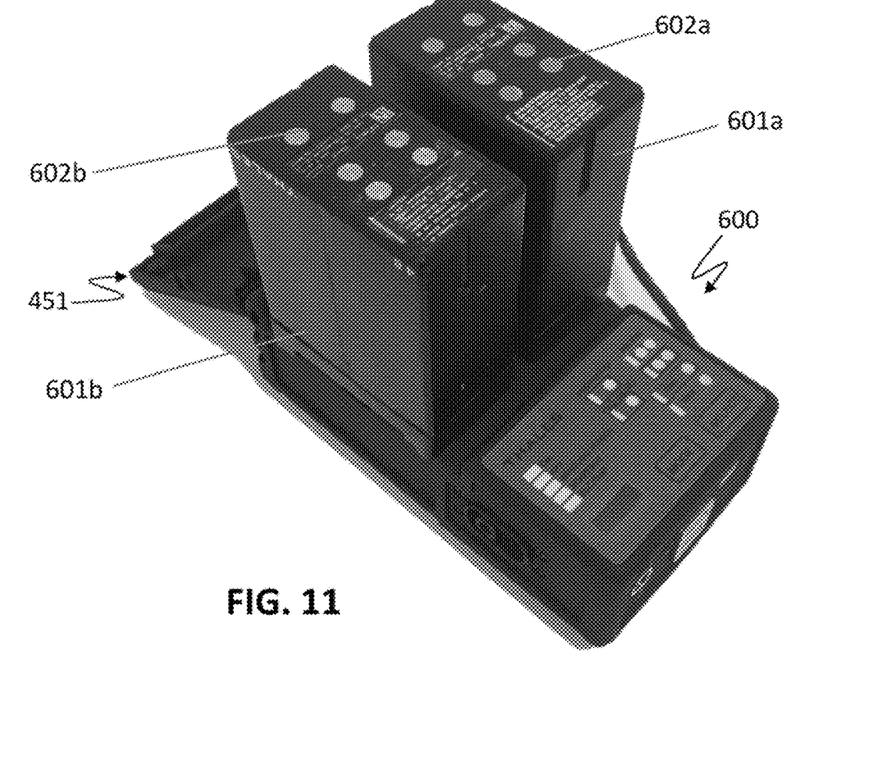
FIG. 11 shows another view of the example charger of FIG. 8 with batteries engaged with the bayonets.

As shown in FIG. 11, because charger 600 is equipped with minimal rotation bayonets as described above with respect to FIGS. 5-10, two batteries 601a and 601b may be rotatably engaged with respective first and second charging ports (e.g., bayonets 605a and 605b and contacts 630a and 630b). Thus, both batteries 601a and 601b may be rotatably engaged with and charged with each respective charge port (e.g., bayonets 605a and 605b and contacts 630a and 630b) within a decreased charger footprint when compared to the charger described with relation to FIGS. 1-4 without the necessity of charging the batteries via the bottom charging ports 602a and 602b. Further, as shown in FIG. 10, the charger 600 may include a pivotable lid 451 capable of pivoting between a charging port covering position (not shown) and a charging port exposure position as shown in FIGS. 10 and 11.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

The claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" Is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

KEY FOR PARTS IN FIGURES

Number Part Names
100 battery
105 top battery contacts
110 battery body
112 top surface
120 battery contact lip
130 seal
200 charger
205 bayonet
220 contact portion
221 charger surface
222 charger contact lip
230 charger contacts
250 pivotable lid
500 battery charger
505 bayonet
510 cut out portion
520 charger contact portions
521 charger surface area
530 charger contacts
600 battery charger
601 batteries
602 bottom charging ports
605 bayonet
620 contact portions
621 charger surface
622 second surfaces
630 contacts

The invention claimed is:

1. A device for operational engagement with a battery or other device, comprising:
   at least one bayonet for rotatably receiving a battery to be engaged therewith, each of the at least one bayonet having:
   a bayonet body;
   at least a first contact portion extending from the bayonet body, the at least a first contact portion having a contact surface extending in a direction approximately perpendicular to the direction of extension from the bayonet body; and
   at least a second contact portion on the bayonet body;
   wherein the battery or other device has a first contact portion that is engageble with the at least a first contact portion of the bayonet body upon engagement of the battery or other device with the bayonet and upon rotation of the engaged battery or other device with the bayonet into full engagement in less than 20 degrees of rotation, and wherein the battery or other device has a second contact portion engageable with the at least a second contact portion of the bayonet body upon rotation of the engaged battery or other device with the bayonet in less than 20 degrees of rotation.

2. The device of claim 1, wherein the battery or other device is a battery for operational engagement with a battery charger.

3. The device of claim 1, wherein the battery or other device is a battery and the device for operational engagement with the battery is a device powered by the battery.

4. The device of claim 3, wherein the device powered by the battery is a radio.

5. The device of claim 1, wherein the bayonet further comprises a first cutout portion adjacent to the first contact portion of the bayonet body and a second cutout portion adjacent to the second contact portion of the bayonet body.

6. The device of claim 1, wherein the each one of the at least one bayonet further comprises:
   a first side at least partially connected to the device; and
   a second side opposite the first side and configured to contact a battery when the battery is rotatably engaged with the bayonet, wherein a first side of the first contact portion of the bayonet body contacts a first contact portion of the battery and the first side of the second contact portion of the bayonet body contact a second contact portion of the battery while the bayonet rotatably received the battery to be engaged therewith.

7. The device of claim 1, wherein the device further comprises at least one electrical contact at a center of the at least one bayonet.

8. The device of claim 1, wherein the at least one bayonet is electrically grounded.

9. A bayonet connector, comprising:
   at least a first contact portion extending from the bayonet body, the at least a first contact portion having a contact surface extending in a direction approximately perpendicular to the direction of extension from the bayonet body; and
   at least a second contact portion on the bayonet body, wherein the battery has a first contact portion that is engageble with the at least a first contact portion of the bayonet body upon engagement of a battery with the bayonet and upon rotation of the engaged battery with the bayonet into full engagement in less than 20 degrees of rotation, and
   wherein the battery has a second contact portion engageable with the at least a second contact portion of the bayonet body upon rotation of the engaged battery with the bayonet in less than 20 degrees of rotation.

10. The bayonet connector of claim 9, wherein the bayonet connector further comprises a first cutout portion adjacent to the first contact portion of the bayonet body and a second cutout portion adjacent to the second contact portion of the bayonet body.

11. The bayonet connector of claim 10, wherein the first cutout portion is ramped towards the first contact portion and the second cutout portion is ramped towards the second contact portion.

12. A charging device configured to charge at least two batteries, the charger comprising:
   at least one bayonet for rotatably receiving a battery to be engaged therewith, each of the at least one bayonet having:
      a bayonet body;
      at least a first contact portion extending from the bayonet body, the at least a first contact portion having a contact surface extending in a direction approximately perpendicular to the direction of extension from the bayonet body; and
      at least a second contact portion on the bayonet body;
   wherein each of the at least two batteries has a first contact portion that is engageble with the at least a first contact portion of each corresponding bayonet body upon engagement of the battery with the corresponding at least one bayonet and upon rotation of the engaged battery with the bayonet into full engagement in less than 20 degrees of rotation, and
   wherein each battery has a second contact portion engageable with the at least a second contact portion of the bayonet body upon rotation of the engaged battery with the bayonet in less than 20 degrees of rotation.

13. The charging device of claim 12, wherein each of the at least one bayonets further comprise a first cutout portion adjacent to the first contact portion of the bayonet body and a second cutout portion adjacent to the second contact portion of the bayonet body.

14. The charging device of claim 12, wherein the each one of the at least one bayonets further comprises:
   a first side at least partially connected to the device;
   a second side opposite the first side and configured to contact a battery when the battery is rotatably engaged with the bayonet;
   wherein a first side of the first contact portion of the bayonet body contacts a first contact portion of the battery and the first side of the second contact portion of the bayonet body contact a second contact portion of the battery while the bayonet rotatably received the battery to be engaged therewith.

15. The charging device of claim 12, wherein the device further comprises at least one electrical contact at a center of the at least one bayonet.

16. The charging device of claim 12, wherein the at least one bayonet is electrically grounded.

* * * * *